Jan. 24, 1967   C. JONES   3,300,124

SEAL CONSTRUCTION FOR ROTARY MECHANISMS

Filed April 14, 1966   4 Sheets-Sheet 1

INVENTOR
CHARLES JONES

BY
ATTORNEY

Jan. 24, 1967 C. JONES 3,300,124
SEAL CONSTRUCTION FOR ROTARY MECHANISMS
Filed April 14, 1966 4 Sheets-Sheet 2
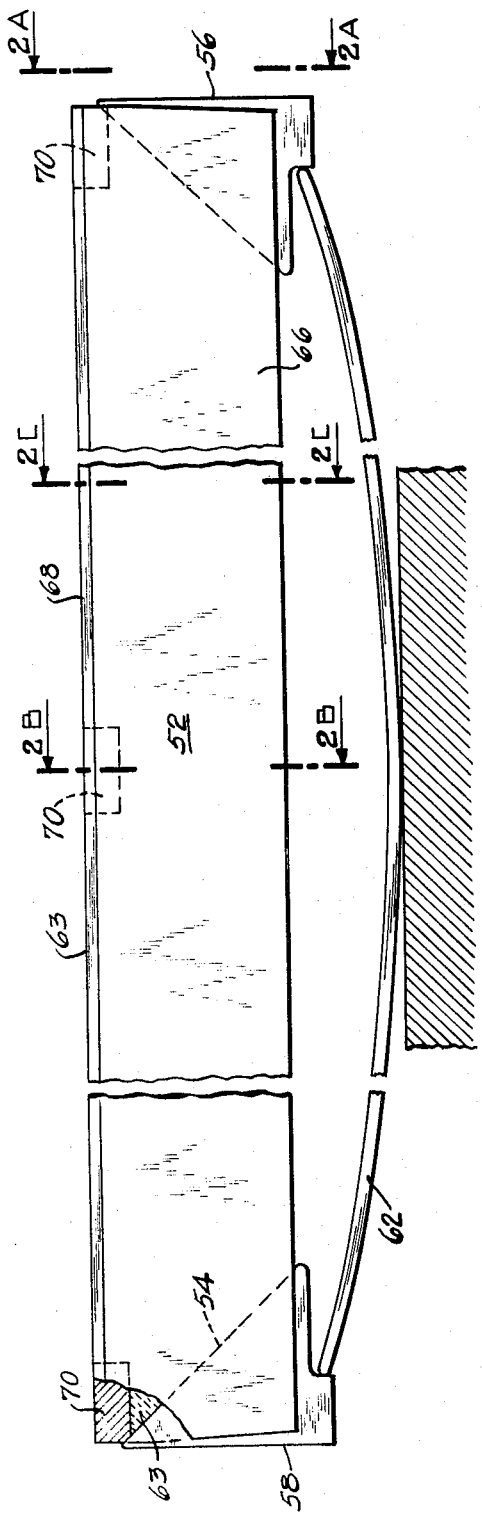
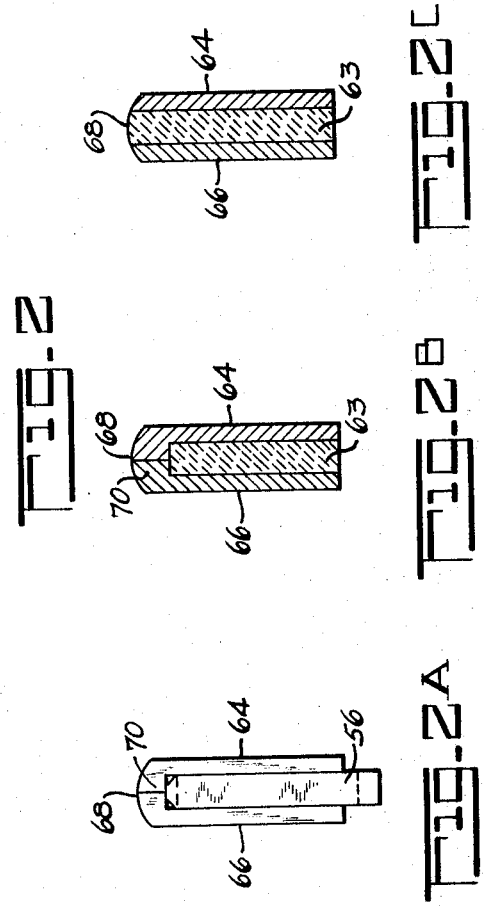
INVENTOR.
CHARLES JONES
BY
ATTORNEY

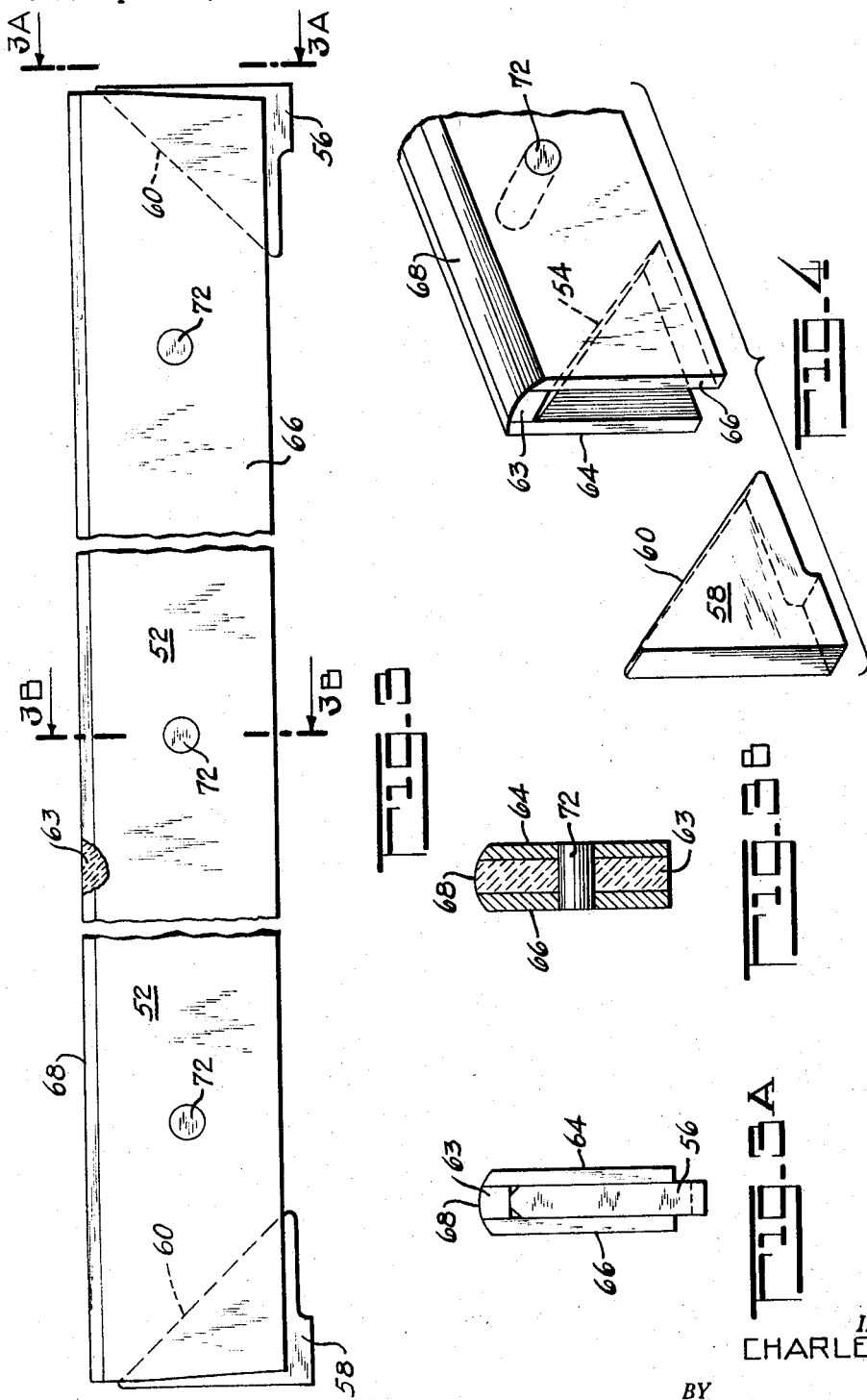

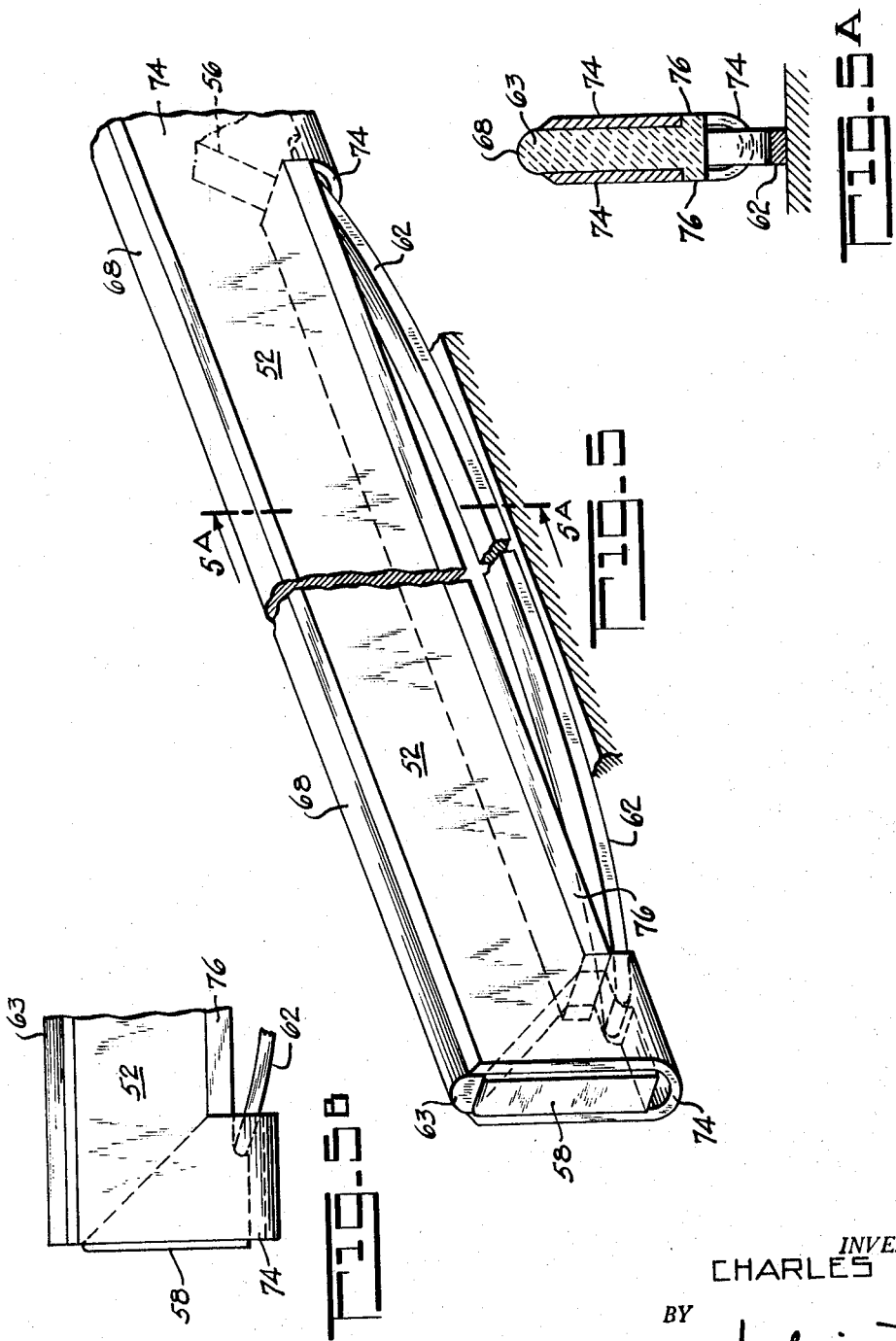

United States Patent Office 3,300,124
Patented Jan. 24, 1967

3,300,124
SEAL CONSTRUCTION FOR ROTARY
MECHANISMS
Charles Jones, Hillsdale, N.J., assignor to Curtiss-Wright
Corporation, a corporation of Delaware
Filed Apr. 14, 1966, Ser. No. 542,630
10 Claims. (Cl. 230—145)

This invention relates to rotary mechanisms and is particularly directed to an improvement in seal construction for said engines.

The seal construction of the present invention is generally of the type shown in my co-pending application Serial No. 384,056, filed July 21, 1964, and is drawn to an improvement over said seal constructions. Although the invention defined herein will be described in relation to a rotary combustion engine, it should be understood that the seal construction of the invention has application in rotary mechanisms in general, such as, fluid pumps, fluid motors, compressors, etc.

As explained in the co-pending application mentioned above, the working chambers of rotary mechanisms may vary in dimension due to thermal expansion or wear of the working chamber walls. In order to effectively seal the working chambers, it is desirable to provide a seal construction which can change its dimensions to provide for the variations in the dimensions in the associated working chamber. The aforementioned co-pending application provides such a seal construction which provides efficient sealing of the working chambers particularly during starting and slow speed operation. The present invention provides a similar construction and in addition makes use of improvements in the seal construction to provide a longer wearing construction and one which has an improvement in its operation. In particular, the present invention provides a long wearing seal structure which can be used in combination with untreated and inexpensive housing surface structures.

The seal construction of the present invention generally comprises a main seal piece which is disposed in sealing engagement with the inner surface of the peripheral wall of the rotary mechanism and also has sealing engagement at a portion thereof with the inner faces of the end walls of said rotary mechanism. Preferably, at least one end face of the main seal piece is inclined and has a mating end seal piece in sliding engagement with said inclined face. A single lobed spring is provided which bears against the end piece to provide a spring force through said end piece for urging the main seal piece into engagement with the inner surface of the peripheral wall and for urging the end piece to slide along the inclined face so that said end piece may be maintained in sealing engagement with an associated end face of an end wall of said rotary mechanism. By this means, the seal construction is axially adjustable to compensate for variations in the axial dimensions of the working chamber and therefore provides an effective seal means even during starting and low-speed operation.

The present invention further provides that at least the main seal piece is composed of a non-metallic material whose major constituent preferably is carbon or graphite which has self-lubricating properties so that the rate of wear between the main seal portion and the inner surface of the peripheral wall will be minimized. Also, the inclined face of the main seal piece will also have self-lubricating properties with respect to the contacting surface of the end piece of the seal, which is preferably metallic, so as to provide more efficient sliding action between these two elements. As will be more fully understood hereinafter, the construction of the seal structure of the invention provides a seal means which has an increased operating life and provides for a more efficient multi-piece seal construction.

Accordingly, it is one object of the invention to provide a novel and improved multi-piece seal construction for a rotary mechanism.

It is another object of the invention to provide a novel and improved seal construction for the working chambers of a rotary mechanism, which seal means provides efficient and long life operation for the working chambers of said rotary mechanism for all speed ranges of operation.

It is an additional object of the invention to provide a novel and improved seal construction for a rotary mechanism wherein a major portion of the seal construction is composed of a non-metallic element which has a relatively long operating life.

Other objects and advantages of the invention will become apparent upon reading the following detailed description with the accompanying drawings in which:

FIG. 2 is a plan view of one embodiment of the invention;

Figure 1:
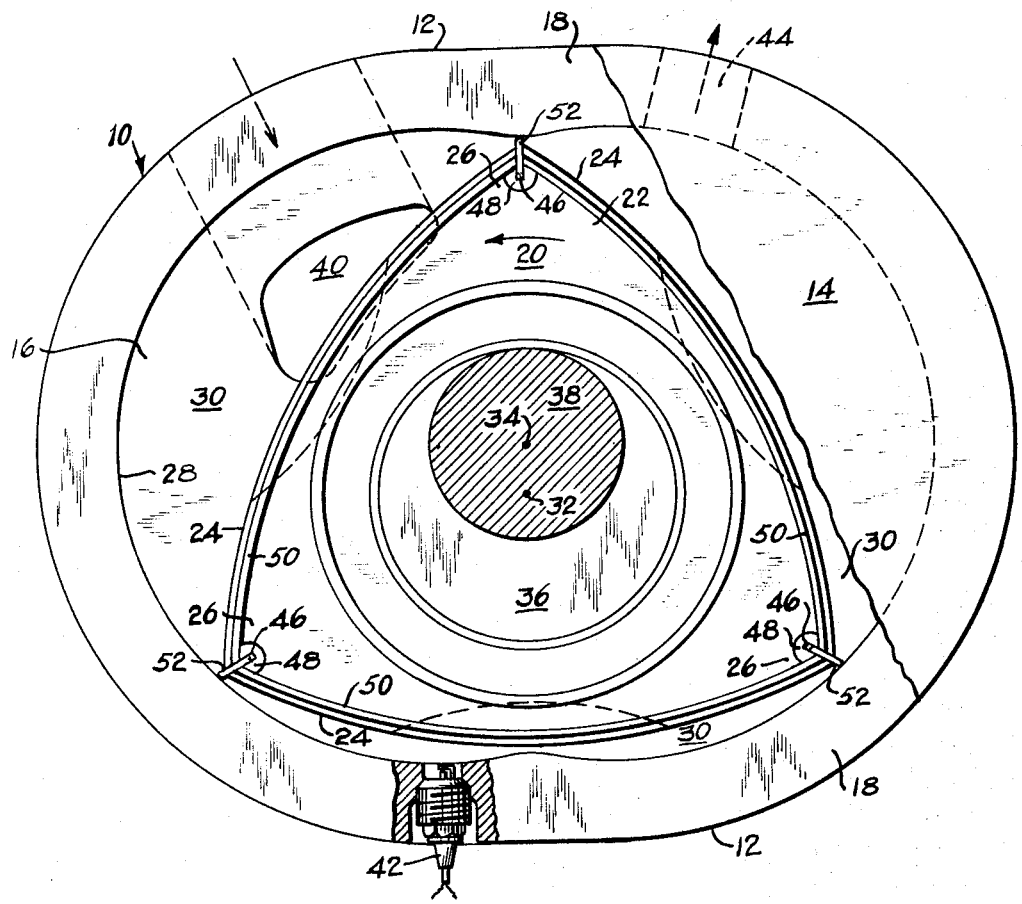
FIG. 1 is an end view of a rotary combustion engine embodying the invention with a portion of one end wall removed.

FIGS. 2a, 2b, and 2c are views respectively taken along lines 2a—2a, 2b—2b, and 2c—2c of FIG. 2;

FIG. 3 is a plan view of a second embodiment of the invention;

FIG. 3a and 3b are views respectively taken along lines 3a—3a and 3b—3b of FIG. 3;

FIG. 4 is a partial exploded view of one seal construction of the invention;

FIG. 5 is an exploded view of a third embodiment of the invention; and

FIGS. 5a and 5b are respectively, a sectional view of FIG. 5 taken along line 5a—5a, and a partial plan view of FIG. 5.

With reference to the drawings, the rotary internal combustion engine is illustrated by reference numeral 10. The engine 10 comprises an outer body 12 including axially-spaced end walls 14 and 16 and a peripheral wall 18 interconnected therewith to form a cavity. As seen in FIG. 1, the cavity has a profile which is preferably a multi-lobed shape which may be defined as being basically an epitrochoid. In the embodiment illustrated, the cavity has two lobes although the engine is not limited to this number.

An inner body or rotor 20 is disposed within the cavity of the outer body 12 with said rotor 20 having axially-spaced end faces, end face 22 only being shown, which are interconnected with a peripheral wall of the rotor, said peripheral wall being defined by outwardly projecting lobe portions 24. The rotor 20 is further provided with a plurality of circumferentially-spaced apex portions 26 which are one more in number than the number of lobes of the cavity. As illustrated, the rotor 20 has three apex portions 26 and the periphery of the rotor has a generally triangular profile. The apex portions 26 are disposed in sealing engagement with the inner surface 28 of the peripheral wall 18 to form a plurality of working chambers 30 between the outer face of the rotor 20 and the inner surface 28 of the outer body peripheral wall 18, there being three such working chambers 30 in the embodiment illustrated. As further illustrated, the axis 32 of the rotor 20 is offset from and disposed parallel to the axis 34 of the outer body.

In the embodiment illustrated, the outer body 12 is preferably stationary while the inner body or rotor 20 is journalled on an eccentric portion 36 of the engine shaft 38 with said shaft 38 being co-axially with that of the cavity of said outer body. During relative rotation of the rotor 20 with the outer body 12, the working chambers 30 vary in volume. An intake port 40 is provided in one or both of the end walls 14 and 16 or in the peripheral wall 18 for admitting air or a fuel-air mixture into the working chambers 30, a spark plug 42 is provided for igniting the combustible mixture and an exhaust port 44 is provided in the peripheral wall for discharging the exhaust gases from the working chambers 30. During engine operation, each of the working chambers 30 has a cycle of operation including the four phases of intake, compression, expansion and exhaust. Suitable gearing may be provided (not shown) to maintain the motion of the rotor 20 relative to the stationary outer body and reference may be made to the aforementioned co-pending application which generally describes a type of gearing that may be used in the present invention.

As explained in the aforementioned co-pending application, the dimensions of the working chambers may vary during operation. This may be particularly due to thermal expansion of the working chambers from a cold starting condition to a condition wherein the engine is at normal operating temperatures. It is therefore desirable to provide a seal construction which may vary its dimensions for differences of the dimensions of the working chambers during operation so that effective sealing will always be provided. This is particularly true during engine starting and at idling or low speed conditions since loss of compression during this time will cause difficulty in starting or roughness in idling. It has been found that it is during starting of the engine and at low speed operation that other seal constructions, such as, one-piece metallic seal constructions, do not provide satisfactory operation because they are not variable in dimension for compensating for the differences in working chamber dimensions. For example, a one-piece metallic seal construction which is sized so as to be satisfactory during starting and low-speed operation will not undergo sufficient expansion to compensate for the thermal expansion of the working chambers when the engine becomes heated-up. It will be understood that leakage past the seal means is more significant at low-speed operation because there is more time, relative to any given phase of the cycle of operation, for the gas to leak through a given sized opening. Any such losses during compression results in a loss of available energy. During the compression phase of the working cycle such losses lower the effective compression ratio and volumetric efficiency. During the power or expansion phase, these losses reduce the pressure level and thus reduce output work and, in addition, by leaking back into a succeeding compression chamber, the charge in said chamber is diluted with products of combustion which adversely effects engine economy and operation.

In a construction of the present invention, the working chambers 30 are sealed by providing a novel apex seal construction, which will be explained in greater detail below. The apex seal means is disposed in a groove 46 in each apex portion 26 of the rotor 20 with said apex seal means preferably running from one end face of one end wall to the other end face of the opposite end wall in a direction parallel to the rotor axis. The apex seal means in each apex portion 26 of the rotor seal the working chambers 30 in a circumferential direction between the respective apex portions 26 and cooperate with intermediate seal bodies 48 disposed in the seal grooves 46 and with said face seal means 50 provided in each end face of the rotor to complete the sealing of each working chamber 30 between the inner surface of the peripheral wall and the end walls of the outer body. The general seal arrangement is known in the art and reference may be made, for example, to U.S. Patent No. 3,033,180 issued to Max Bentele on May 8, 1962, for a more detailed description of the intermediate and side face seal means which cooperate with the apex seal means.

The apex seal means of the present invention comprises a main seal piece 52 which extends substantially from one end face of one end wall in the outer body to the end face of the opposite end wall. As shown in particular in FIGS. 2 and 4, the main seal piece 52 has a cutout portion at each end thereof which cutout portions each have inclined end faces 54 which are inclined to the engine axis in a direction toward an associated end face and which pass adjacent to the radially outward corner at each end of said main seal piece 52. A pair of substantially triangular shaped end pieces 56 and 58 are provided in each cutout portion of the main seal piece 52 which end pieces 56 and 58 each have an inclined face 60 for mating engagement with the inclined face 54 at each end of the main seal piece 52. It will be seen from FIGS. 2, 2a and 4 that the end seal pieces are received within the cutout portion in the main seal piece 52 with the surrounding wall structure of the main seal piece at the cutout portion providing a protective sheath for the end seal piece.

In order to maintain sealing contact between the main seal piece 52 and the slidable end seal pieces 56 and 58, a single-lobed curved leaf spring 62 is provided and is disposed so as to provide a spring force against the bottom or radially inward side of each of the end pieces 56 and 58, respectively, and the bottom portion of the spring is disposed so as to bear against the bottom of the apex seal groove 46. The spring arrangement is such that that major force from the spring means passes through the end pieces 56 and 58 so that the greatest radial spring force provided for the main seal piece 52 must pass through the end seal pieces 56 and 58. This will insure sealing engagement between the inclined faces 54 of the main seal piece and the inclined faces 60 of the end seal pieces 56 and 58 even during relative movement between the main seal piece and the end seal pieces. Since the single-lobed spring bears solely against the end seal pieces 56 and 58, the main seal piece 52 will be urged into sealing engagement with the inner surface 28 of the peripheral wall 18 with a force which is directed through the end seal pieces and sealing engagement between said end seal pieces 56 and 58 at the mating surfaces 54 and 60 will always be maintained. It will be seen, therefore, that during starting of the engine, particularly when the engine is cold, or during low-speed operation, the end seal pieces 56 and 58 will be disposed substantially entirely with the cutout portions of the main seal piece 52 and as the engine begins to heat up and the working chambers expand, the end seal pieces may slide relative to the main seal piece to increase the over-all axial width of the apex seal means to correspond to the increase in axial dimension of the working chambers. Reference may be made to co-pending application Serial No. 384,056, filed July 21, 1964, for a more detailed description of the seal structure and operation thus far described.

As stated above, the present invention is directed to an improvement over the seal construction disclosed in the aforementioned co-pending application. It is known that certain non-metallic materials have relatively low wear rates with little or no lubrication and are compatible with a wide variety of mating surfaces, such as chromium and hardened cast iron. The present invention is directed at taking advantage of the aforementioned desirable properties of some of the non-metallic materials for application in a novel seal construction. Referring again to FIGS. 2, 2a–2c and 4, the main seal piece 52 shown therein is composed substantially entirely of a non-metallic material whose major constituent is preferably carbon or graphite. The seal piece 52 may also be an impregnated material having a large carbon or graphite content. As is known, carbon and graphite are not relatively strong materials and may be subject to fracture upon impact with the seal groove walls of the rotor or with the inner surface of the peripheral wall during operation of the engine. Further, materials of this type are also subject to burning erosion during the combustion phase of operation. Further, in accordance with the invention, the non-metallic portion 63 of the main seal piece 52 is protected by a shield construction comprising a pair of metal plates 64 and 66 (FIG. 2c) which are preferably suitably cemented or brazed to the non-metallic center portion of the main seal piece 52. As further shown in FIGS. 2 and 2c, the radially outermost center portion or exposed portion 68 of the main seal piece 52 is composed of the non-metallic portion of the seal so that during engagement of the inner surface of the peripheral wall, the seal member will contact said inner surface with the non-metallic portion. Thus, the longer wearing portion of the seal member will be disposed in contact with the inner surface of the peripheral wall to provide a greater operating life for the seal member.

As shown in FIGS. 2, 2a and 2b, the end plates may be interconnected across the center portion of the seal member as shown at 70. These interconnecting portions 70 of the metal end plates 64 and 66 serve the purpose of holding the seal construction during the cementing or brazing process and for the initial break-in period wherein the metal interconnecting portions 70 will gradually wear away to the same level as the level of the non-metallic material surface in that they have a greater rate of wear than the non-metallic portion 68 of the seal member 52. Of course, a mechanical connection of this type may also serve as an alternative to cementing or brazing. As is also well known, carbon and graphite are characterized in that they have relatively self-lubricating properties so that during rubbing contact of the outer portion 68 of the apex seal member with the inner surface 28 of the peripheral wall 18, little or no lubrication will be required for the seal means due to the substantially self-lubricating properties of the materials. Also, the inclined end faces 54 of the main seal piece 52 are composed of the non-metallic material, again such as carbon or graphite, which inclined faces 54 are disposed in rubbing, sliding engagement with the inclined faces 60 of the metallic end pieces 56 and 58 so that, due to the lubrication properties of carbon or graphite, the end pieces 56 and 58 may move relatively freely without being subjected to binding which may result in some cases of metal-to-metal contact. It will be seen, therefore, that the construction thus far described for the apex seal means provides a relatively long wearing construction, which construction is protected from failure due to fracture or burning erosion and wherein the multi-piece construction may operate relatively efficiently for compensating for variations in the dimensions of the working chambers of the invention during operation.

FIGS. 3, 3a and 3b show another embodiment of the invention which is substantially similar to that shown in FIGS. 2 and 2a–2c with like numerals being used for like elements. In FIGS. 3, 3a and 3b the method of attaching the end plates 64 and 66 of the shield construction differs from that shown in the above-mentioned embodiment in that, in this embodiment, the shield plates 66 and 68 are pinned to the non-metallic portion of the seal through pin members 72 passing through said plates 66, 68 and the non-metallic portion of the seal member, as illustrated. The pin construction of FIGS. 3, 3a and 3b has the advantages of being relatively less expensive for assembly and said construction is not substantially effected by high temperatures which may effect some cementing or brazing types of assembly. Otherwise, the operation of the seal member and its construction of the embodiment shown in FIGS. 3, 3a and 3b is the same as that shown in the embodiments of FIGS. 2 and 2a–2b.

FIGS. 5, 5a and 5b show still another embodiment of the invention. Again, like numbers will be used to illustrate like elements. In the embodiment of FIG. 5 the non-metallic center portion 63 of the main seal piece 52 is again preferably composed of a material whose major constituent is carbon or graphite. The center portion 63 is protected by a metallic shield comprising a substantially U-shaped clamp member 74 disposed around a substantial portion of the main seal piece 52. The clamp member 74 has a cutout portion in the center and bottom-most portion thereof in order to permit the spring 62 to bear against the end pieces 56 and 58, as described above, and the center portion 63 of the main apex seal piece is provided with a ledge 76 on each side of the bottom portion thereof which ledge extends into engagement with the upper portion of the cutout in the clamp member 74 to prevent the seal from being forced radially outwardly out of the clamp member 74. Thus, the spring member 62 will urge the main seal piece 52 into radially outward engagement with the inner surface of the peripheral wall through its spring action on the end seal pieces 56 and 58 and the ledge portion 76 of the center portion 63 will prevent the seal portion 63 from being forced too far in the radial direction relative to the U-shaped clamp member 74. Again, the operation of the seal construction as shown in FIG. 5 is substantially the same as that described above.

As will be apparent in the above detailed description, a novel seal construction is provided which is adjustable for variations in the dimensions of the working chambers of the engine for all conditions of operation and which seal construction has a relatively low rate of wear due to the materials used therein. It will be further seen that a novel means is provided for protecting the non-metallic portion of the seal construction so that destruction due to fracture or burning erosion is substantially minimized.

While the invention has been described in detail in its preferred embodiment, it will be obvious to those skilled in the art, after understanding the invention, that various changes and modifications may be made therein without departing from the spirit or scope thereof. For example, the invention may be embodied in a two-piece construction with only one adjustable end piece and the sheath construction may be eliminated and the seal constructed as shown in the aforementioned co-pending application. It is intended in the appended claims to cover all such modifications.

I claim:
1. A sealing construction for the working chambers of a rotary mechanism having an outer body including a cavity; a rotor disposed in said cavity for relative rotation with said outer body, said rotor and said outer body defining a plurality of working chambers therebetween which vary in volume during relative rotation of said rotor, said rotor including a plurality of grooves with each groove containing a sealing construction therein; said sealing construction comprising a multi-piece seal structure moveably disposed in each groove in said rotor for sealing engagement with the walls of said outer body cavity, said multi-peace seal member including a first seal piece extending substantially from one end face of said rotor to the other, said first seal piece having at least one end face inclined in a direction toward its associated rotor end face; a second seal piece having an inclined face disposed for mating relative sliding engagement with the inclined end face of said first seal piece such that the axial dimensions of said multi-piece seal member may vary during relative sliding movement between said first and second seal pieces; and said first seal piece being composed of a non-metallic material having relatively low friction characteristics at least at its cavity wall engaging surfaces and including its inclined end face, and said first seal piece having a protective shield structure supported on its groove wall engaging surfaces for protecting said first seal piece during movement in said groove.

2. A sealing construction as recited in claim 1 wherein said non-metallic material comprises a material whose major constituent is carbon.

3. A sealing construction as recited in claim 1 wherein said non-metallic material comprises a material whose major constituent is graphite.

4. A sealing construction as recited in claim 1 wherein said protective shield structure comprises a metallic plate secured to each side face of said first seal piece.

5. A sealing construction as recited in claim 4 wherein said metallic plates are secured to first seal piece by means of pins passing through said metallic plates and said first seal piece.

6. A sealing construction as recited in claim 4 wherein said metallic plates are interconnected through metallic strips overlying a portion of said first seal piece.

7. A sealing construction as recited in claim 1 wherein said protective shield structure comprises a metallic U-shaped clamping member having a cutout portion therein and said first seal piece having a ledge structure disposed in said cutout portion to prevent said first seal piece from passing radially outwardly from said U-shaped clamping member.

8. A sealing construction as recited in claim 1 wherein said second seal piece is composed of a metallic material.

9. A sealing construction as recited in claim 1 wherein said inclined face of said first seal piece is recessed in a groove in the end face of said first seal piece such that said first seal piece forms a sheath around a portion of said second seal piece beyond the mating surfaces of said first and second seal pieces.

10. A sealing construction as recited in claim 1 wherein said first seal piece has an inclined face at each end thereof; and a second seal piece being disposed for mating relative sliding engagement with each of said inclined end faces of said first seal piece.

References Cited by the Examiner
UNITED STATES PATENTS

| | | | |
|---|---|---|---|
| 3,033,180 | 5/1962 | Bentele | 103—130 |
| 3,102,518 | 9/1963 | Anderson | 230—145 |
| 3,127,095 | 3/1964 | Froede | 230—145 |
| 3,130,900 | 4/1964 | Schlor | 230—145 |
| 3,176,909 | 4/1965 | Maurhoff | 230—145 |
| 3,180,564 | 4/1965 | Fuhrmann et al. | 123—8 |
| 3,194,488 | 7/1965 | Fuhrmann | 230—145 |
| 3,197,125 | 7/1965 | Bachman et al. | 123—8 |
| 3,235,171 | 2/1966 | Frenzel et al. | 230—145 |

DONLEY J. STOCKING, *Primary Examiner.*

W. J. GOODLIN, *Assistant Examiner.*